UNITED STATES PATENT OFFICE.

ELLIS M. POTTER, OF NEW YORK, N. Y.

TREATING AND ROASTING COFFEE.

994,785. Specification of Letters Patent. Patented June 13, 1911.

No Drawing. Application filed July 1, 1910. Serial No. 570,029.

*To all whom it may concern:*

Be it known that I, ELLIS M. POTTER, a citizen of the United States, residing in the city, county, and State of New York, have invented new and useful Improvements in Treating and Roasting Coffee, of which the following is a full, clear, and exact specification.

My invention is based upon the discovery by me that green coffee roasted with green chicory acquires a delicate and delicious flavor not possessed by ordinary roasted coffee.

Chicory, a well known root grown in this and other countries, has heretofore been used for a coffee substitute and for blending with coffee. It has always been separately roasted, usually in cylinders similar to those employed for roasting coffee, and when it has been desired to use it in combination with coffee it has been ground to about the same granulation as ground coffee and mixed mechanically therewith in such proportion as the trade demanded.

In my process, I take the green chicory root, which has been cut into small pieces and dried, and mix the same with green coffee, and roast them together by the ordinary process of roasting, *i. e.*, in the same manner that coffee is roasted alone by any of the usual methods, as in cylinders heated internally or externally. The quantity of chicory to be roasted with any given quantity of coffee varies, due in part to the characters of the different coffees used. In ordinary procedure, I use from twenty to thirty pounds of the chicory root to a bag of 130 pounds of coffee; but this proportion may be changed to increase or diminish the relative quantity of chicory as may appear desirable. The temperature required for the roasting varies from 300 to 500 degrees Fahrenheit, or thereabout, depending upon the quality and condition of the ingredients and the thoroughness of roasting desired. After roasting, the coffee and chicory are entirely separated, leaving no trace of one with the other.

By roasting the two products together in the same cylinder, there is imparted to the coffee the delicate flavor of the chicory, which in the ordinary roasting of chicory is passed off to the atmosphere; and incidentally the aroma of the coffee is imparted to and materially changes the drinking quality of the chicory, so that both products are improved in their drinking properties. Coffee roasted by this process makes a delicious and delicate drink, quite different from any coffee or other beverage now known to commerce. At the same time the appearance of the coffee is not changed.

The green and dried chicory root used for roasting with coffee is cut up into pieces preferably of about the size of dried apricots or figs.

I am aware that it has been proposed heretofore to utilize the aromatic vapors developed in roasting coffee by effecting the absorption of such vapors by a coffee substitute, such as chicory, after the volatile and worthless vapors from the coffee have passed off. My invention, however, is not concerned with the improvement of coffee substitutes in the manner stated, but its object is to improve the quality and flavor of the coffee itself.

I claim as my invention and desire to secure by Letters Patent:

1. The herein described method of treating and roasting coffee, which consists in mixing green chicory root with the green coffee bean or berry, then roasting the mixture, whereby the quality of the coffee is improved and the flavor softened and enriched, and subsequently separating the coffee from the chicory.

2. An improved coffee consisting of roasted coffee beans having the flavor of blended coffee and chicory.

In testimony whereof I affix my signature, in presence of two witnesses.

ELLIS M. POTTER.

Witnesses:
D. SELIGSON,
C. W. GRIFFIN.